April 18, 1939.    F. W. SCHLALOS    2,154,777
FLOW RESPONSIVE MECHANISM
Filed Jan. 4, 1937
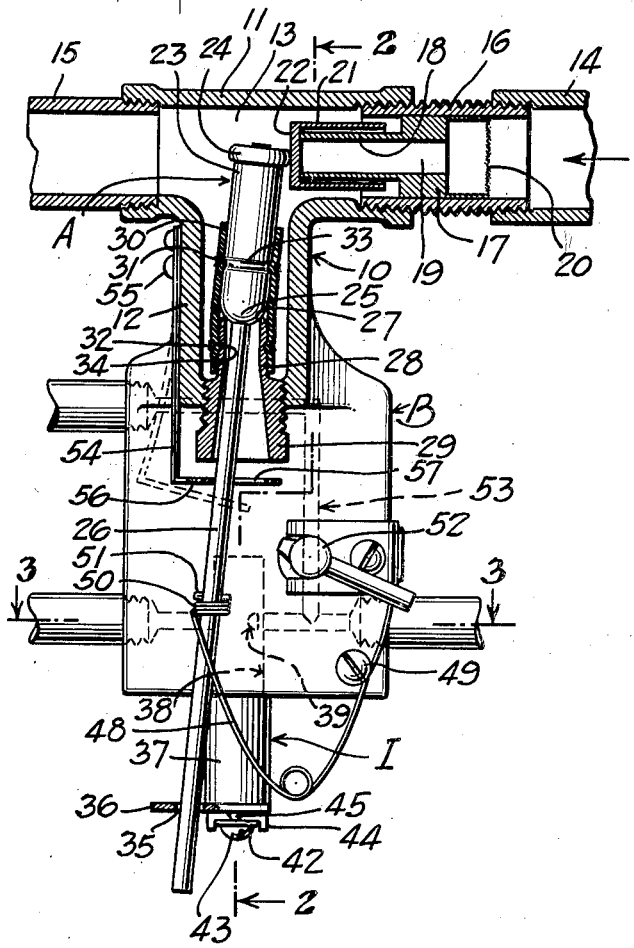
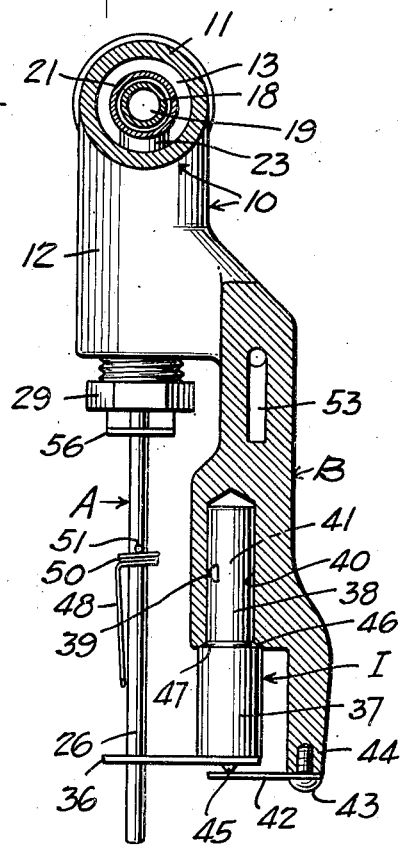
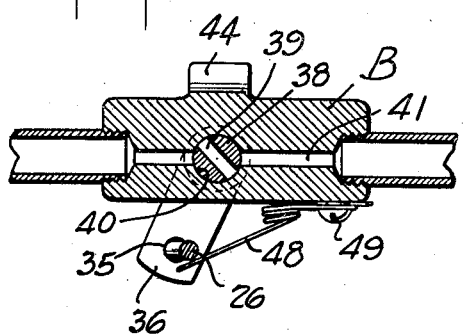
INVENTOR
FREDERICK W. SCHLALOS
BY
ATTORNEYS Patented Apr. 18, 1939

2,154,777

UNITED STATES PATENT OFFICE 2,154,777

FLOW RESPONSIVE MECHANISM

Frederick W. Schlalos, Sierra Madre, Calif.

Application January 4, 1937, Serial No. 119,048

1 Claim. (Cl. 137—152)

This invention relates generally to devices for controlling an instrumentality such as a gas valve, electric switch or a signal, by and in accordance with the velocity or rate of flow of a fluid in a conduit.

An object of the invention is to provide a mechanism which in one of its many uses can be associated with the water and gas supply pipes for water heater of the instantaneous type to accurately control the flow of gas to the main burner of the heater in accordance with the rate of water flowing from an outlet at a faucet or other dispensing fixture and irrespective of low velocity and small volume of water flow, by the use of a tubular abutment member closed at one end and mounted for rectilinear movement on a water inlet tube, with a restricted annular water passage defined between the member and tube, so that with the member operatively associated with an instrumentality to be actuated, such as the gas valve for the main burner, the volume of gas permitted to flow with respect to the volume of water to be heated, will be such as to effect heating of the water to an approximately uniform temperature irrespective of the volume of water being dispensed.

Another object of the invention is to provide a flow responsive mechanism of the above described character which, among other features, positively prevents the overheating of water when being dispensed in small quantities, so as to obviate or reduce to a minimum the formation of lime in the heater coil; which is extremely sensitive to variations in water flow by the specific co-action and functional relationship of the abutment member and inlet tube as above structurally characterized so as to accurately control an instrumentality such as a gas valve; which is of simple, compact and leak-proof construction; and which is readily assembled and disassembled for inspection, repair and replacement of parts.

With these and other objects in view, the invention consists in the combinations, arrangements and functional relationships of elements as set forth in the following specification and particularly pointed out in the appended claim.

In the accompanying drawing,

Figure 1 is a view partly in side elevation and partly in vertical section, showing the flow responsive mechanism embodying this invention;

Figure 2 is a vertical sectional view taken on the line 2—2 of Figure 1;

Figure 3 is a horizontal sectional view taken on the line 3—3 of Figure 1.

In carrying the invention into practice, a generally rectangular metal body B is provided with a T-shaped and laterally offset extension 10 having an open ended tubular portion 11 from which laterally projects a tubular portion 12 together defining a chamber 13 adapted to form part of a water supply line, between sections 14 and 15 of which the portion 11 is interposed so that water under pressure from a source of supply (not shown) can flow from the section 14 through the chamber 13 and then into the section 15 when an outlet from the latter is opened.

Fixed in a nipple 16 in the inlet end of the portion 11 is a plug 17 from which projects into the chamber 13 a water inlet, or metering tube 18, the bore 19 of which extends through the plug. At the inlet side of the plug 17 a screen 20 is mounted in the nipple 16 to prevent the entrance of foreign substances into the chamber.

Loosely mounted on and directly supported by the water inlet tube 18 so as to be freely slidable thereon is a water operated abutment member 21 in the form of a cup against the closed end wall 22 of which water discharging from the tube 18 is adapted to impinge to effect substantially rectilinear axial movement of the member on the tube in the direction of the water flow.

The aforestated rectilinear motion of the abutment member 21 by the water is transmitted to an actuator A for an instrumentality I which latter in the present instance is adapted to control the flow of a fluid such as gas for the heating of water in a water heater of the instantaneous type (not shown).

The actuator A is in the form of a lever of the first class fulcrumed in the chamber 13 and constructed to provide a cylindrical arm 23 on one end of which is rotatably mounted an anti-friction roller 24 adapted to bear against the end wall 22 of the abutment 21. At its other end, the arm 23 forms a portion of a sphere as indicated at 25 and has extending therefrom a relatively long rod 26.

The spherical portion 25 of the arm 23 engages an annular seat 27 formed by the free upper end of a tubular shank 28 of a tubular plug 29 threaded into the free end of the tubular portion 12 of the body B. The spherical portion 25 and seat 27 co-act to provide the aforestated fulcrum for the actuator A, so as to mount the actuator for rocking movement in all directions about the center of the portion 25.

A sealing sleeve 30 tightly embraces the arm 23 and shank 28 and is clamped thereto by metal bands 31—32 sufficiently crimped to force the material of the sleeve into annular grooves 33—34 in the peripheries of the arm and shank. In applying the sleeve to the arm and shank the sleeve is longitudinally stressed so as to yieldingly urge the spherical portion 25 of the arm into sealing engagement with the seat 27. It will be noted that at the fulcrum point of the actuator A the sleeve 30 is clear of the arm 23 and shank 28 so that the sleeve is free to be laterally deformed and/or displaced at this point in order not to restrict rocking movement of the actuator, yet will effectively seal the fulcrum against leakage of water from the chamber 13.

Adjacent its free end the rod passes freely through an opening 35 in the operating lever 36 of a rotary gas valve 37 which, in the present instance, constitutes the instrumentality I, and has a reduced cylindrical portion 38 apertured diametrically at 39 and rotatably mounted in a bore 40 in the body B to control the flow of gaseous fuel from a source of supply through a duct 41 in the body to the burner of an instantaneous water heater (not shown).

The valve 37 is yieldingly urged axially into the bore 40 by a flat spring 42, one end of which is secured by a screw 43 to a lug 44 on the body. The free end of the spring 42 bears against an axial projection 45 on the outer end of the valve 37 and co-acts therewith to maintain an annular beveled shoulder 46 on the valve in fluid sealing engagement with an annular beveled shoulder 47 at the outer end of the bore 40, yet permits unrestricted rotary movements of the valve in one direction by the actuator A, and in the other direction by a spring 48. The spring 48 is fixed to the body B by a screw 49 and is freely looped at its other end around the rod 26, the looped portion 50 of the spring engaging a pin 51 on the rod for co-action therewith in normally urging the valve 37 to closed position.

Any suitable pilot-valve 52 can be provided in the body B to control the flow of fuel through a by-pass duct 53 to a pilot burner (not shown). It will be noted that a portion of the wall of the aperture 39 is flat and parallel to the axis of the valve, and that as this portion of the aperture wall is the leading edge during opening movement of the valve, that a sufficient volume of gas can flow in a slightly opened position of the valve to insure heating of water in the heater.

A bi-metallic thermostat 54 is secured at one end by screws 55 to the body B to extend along the portion 12 thereof. At its other end, which extends beyond the plug 29, the thermostat is provided with an angularly projecting arm 56 having an elongated slot 57 freely receiving the rod 26 to permit unrestricted movement thereof during normal operation of the actuator A. The thermostat 54 provides a safety device operable in the event that the spring 48 should fail with the gas valve 37 left in an open position, to co-act with the rod 26 in closing the valve. It will be appreciated that under such conditions heating of the water from the heater back into the chamber 13 would be effected, and would cause flexing of the thermostat to the dotted line position shown in Figure 1 with the resulting closing of the valve 37.

The operation of the invention is as follows: Let it be assumed that the body B is installed as shown in Figure 1 in the lines for supplying water to the heating coil and gas to the main burner of a water heater of the instantaneous type from which water is adapted to be dispensed under the control of a faucet or other valve controlled outlet (not shown).

So long as no water is flowing in the water line, the spring 48 will co-act with the rod 26 of the actuator A to maintain the actuator in the extreme position shown in Figure 1 wherein the gas valve 37 is closed and the water operated abutment member 21 occupies its fully retracted or telescoped position on the water inlet tube 18.

However, upon opening the outlet of the water line, the resulting flow of water into the inlet tube 18 will cause the water to impinge against the end wall 22 of the abutment member 21 so as to advance the member on the tube as the water flows through the annular space between the tube and the member, into the chamber 13 and then through the section 15 to the heating coil of the water heater.

This movement of the member 21 by the flowing water will be directly transmitted to the actuator A through its roller 24 to thus rock the actuator against the spring 48 and proportionately open the gas valve 37. Assuming that the pilot of the heater is burning, the gas will be ignited at the main burner of the heater so as to heat the water flowing through the coil to the opened outlet.

By further opening the outlet to dispense a larger quantity of water, it will be clear that the velocity or flow rate of the incoming water in the tube 18 will be increased, thus causing the water to impinge against the abutment member 21 with greater force, to thereby further advance the member and further open the gas valve 37.

It will thus be apparent that the volumetric flow of gas to the burner will be in substantially definite proportion to the volumetric flow of water from the outlet, to the end of enabling the water to be heated to an approximately uniform temperature, irrespective of the amount of water being dispensed. It will be appreciated that as the opening of the outlet is reduced to dispense less water, that the impinging force of the water upon the member 21 will be lessened by the resulting decrease in the velocity of water in the tube 18, thus rendering the spring 48 free to reversely move the actuator A and proportionately reduce the amount of gas supplied to the burner.

It will be understood that sufficient clearance is intended to exist between the inlet tube 18 and the abutment member 21 for the maximum flow of water required for a particular use of the invention, which, in the case of a domestic water heater, may be from one to one and one-half gallons or more per minute at the prevailing water pressure.

What is claimed is:

In flow responsive mechanism, a cylindrical water inlet tube; a movably mounted actuator adapted for operative connection to an instrumentality to be actuated; and a cylindrical abutment member having one end closed, and being mounted on said inlet tube so as to be directly supported thereby for substantially rectilinear movement and in operative association with the actuator, said abutment member being of sufficiently larger diameter than the external diameter of said inlet tube, to provide a restricted annular water passage between the two by which the flow of water into the tube is caused to accurately move the abutment member irrespective of low velocity and small volume of water flow.

FREDERICK W. SCHLALOS.